(12) United States Patent
Albouy et al.

(10) Patent No.: US 6,624,208 B2
(45) Date of Patent: Sep. 23, 2003

(54) BLOWING AGENT BASED ON HFC-134A AND CYCLOPENTANE FOR THE EXPANSION OF POLYMERS

(75) Inventors: Arnaud Albouy, Paris (FR); Gérard Guilpain, Rueil Malmaison (FR); Richard McMaster Crooker, Fogelsville, PA (US)

(73) Assignee: Atofina, Puteaux (FR)

( * ) Notice: Subject to any disclaimer, the term of this patent is extended or adjusted under 35 U.S.C. 154(b) by 35 days.

(21) Appl. No.: 10/060,288

(22) Filed: Feb. 1, 2002

(65) Prior Publication Data

US 2002/0123533 A1 Sep. 5, 2002

(30) Foreign Application Priority Data

Feb. 2, 2001 (FR) .............................. 01 01415

(51) Int. Cl.$^7$ .................................. C08J 9/14
(52) U.S. Cl. .................... 521/98; 521/79; 521/131; 521/146
(58) Field of Search ............. 521/79, 98, 131, 521/146

(56) References Cited

U.S. PATENT DOCUMENTS

| | | | | |
|---|---|---|---|---|
| 5,883,145 A | * | 3/1999 | Hurley et al. | |
| 5,993,707 A | * | 11/1999 | Chaudhary et al. | |
| 6,174,471 B1 | * | 1/2001 | Park et al. | |
| 6,258,863 B1 | * | 7/2001 | Harfmann et al. | |
| 6,348,515 B1 | * | 2/2002 | Wu | |

FOREIGN PATENT DOCUMENTS

| | | |
|---|---|---|
| DE | 198 17 507 | 10/1999 |
| JP | 1-139675 | 6/1989 |
| WO | WO 98/03581 | 1/1998 |
| WO | WO 00 01761 | 1/2000 |

OTHER PUBLICATIONS

French Search Report for corresponding French Appln. No. FR 0101415 dated Oct. 2, 2001.

Montreal Protocol on Substances that Deplete the Ozone Layer, published Apr. 2000 "Report of Technology and Economic Assessment Panel" pp. 62 and 63.

* cited by examiner

*Primary Examiner*—Morton Foelak
(74) *Attorney, Agent, or Firm*—Smith, Gambrell & Russell, LLP

(57) ABSTRACT

Composition that can be used as a polymer blowing agent, comprising from 60 to 98% of HFC-134a and from 2 to 40% of cyclopentane;

polymeric composition comprising it, and process for manufacturing an expanded polymer using it.

13 Claims, 2 Drawing Sheets

Partition coefficient (K)

BLOWING AGENT BASED ON HFC-134A AND CYCLOPENTANE FOR THE EXPANSION OF POLYMERS

FIELD OF THE INVENTION

The subject of the present invention is a composition that can be used as a blowing agent, a polymeric composition comprising it, and a process for producing an expanded polymer by extrusion using this same composition. It relates more particularly to a process for producing extruded expanded polystyrene panels.

BACKGROUND OF THE INVENTION

In general, expanded polymers are manufactured by melting granules of a thermoplastic polymer under pressure in an extruder and then by blending a volatile blowing agent into the molten resin under controlled temperature and pressure conditions allowing this blend to be maintained in an essentially liquid or viscous state. Next, this blend is extruded through a die in a zone at a lower pressure and at a fixed temperature (generally at atmospheric pressure and at room temperature) so as to obtain a solid polymeric structure of the desired shape, which has a multiplicity of substantially closed cells, the size of which is generally between 0.1 and 1.5 mm. The term "closed cells" is understood to mean cells which are not interconnected, in other words, cells which are separated from one another by a wall of polymeric material whose thickness is of the order of one micrometer.

Such a polymeric structure can be used in the form of sheets for use as thermoformable material for the production of food packaging, or else in the form of panels suitable for thermal insulation in the building field. The thickness of the expanded sheets formed by extension is generally between 0.5 and 10 mm, preferably between 1 and 8 mm; the thickness of the insulation panels is usually between 10 and 200 mm, preferably between 20 and 160 mm. The density of an expanded material formed by extension is often between 10 and 250 kg/m$^3$, that of the sheets preferably being between 50 and 150 kg/m$^3$, while that of the panels is between 20 and 60 kg/m$^3$, even more preferably between 25 and 50 kg/m$^3$.

The thermal insulation properties of expanded polymers derive to a large extent from the thermal conductivity of the gas which fills the closed cells of the material, which gas is introduced during the manufacturing process as a blowing agent.

1,1-Difluoro-1-chloroethane, of formula $CF_2Cl-CH_3$ (usually called HCFC-142b), and its mixtures with difluorochloromethane (usually called HCFC-22) are the blowing agents most widely used in the world for manufacturing expanded polystyrene panels intended for thermal insulation. However, during ageing of the expanded polymers these gases tend to migrate through the walls of the closed cells of the insulating material, owing to their permeability in this medium, and join the atmosphere where, because of their non-zero ODP (Ozone Depleting Potential) they are liable to represent a threat to the environment, especially in the case of the stratospheric ozone layer.

It is therefore necessary to substitute HCFCs (hydrochlorofluorocarbons) currently used in extrusion-expanded polymers with HFCs (hydrofluorocarbons) whose molecule, not containing a chlorine atom, has an ODP of 0. Moreover, HFCs have been developed for the refrigeration field. The need to make such a substitution is made all the greater by a forthcoming legal prohibition of HCFCs in Europe.

International Application WO 98/03581 describes the use of HFC-134 (1,1,2,2-tetrafluoroethane) for the production of thermoplastic foams. However, although HFC-134 advantageously has an ODP of 0, it is not a product widely available from the industrial standpoint.

The United Nations, within the context of their UNEP (United Nations Environment Programme), published a report in April 2000 entitled "*Report of the Technology and Economic Assessment Panel*" dealing with the Montreal Protocol relating to substances which deplete the ozone layer. This report (on pages 62 and 63) recommends HFC-152a (1,1-difluoroethane) as an HFC-type blowing agent intended for the manufacture of expanded polystyrene panels. However, this compound has a high permeability in polystyrene which, as a result of the gradual substitution in the closed cells of the blowing agent with air, which has a higher thermal conductivity, results in a rapid deterioration over time of the insulating properties of the corresponding polystyrene panels.

Among the HFC substitutes which may be envisaged, HFC-134a (1,1,1,2-tetrafluoroethane) may, because of its low thermal conductivity, make it possible to obtain insulating properties for the expanded polymer formed which are equivalent to those obtained with HCFC-142b. In addition, both these molecules have a low permeability through the polymer so that, advantageously, the good thermal insulation properties are maintained over time, even after many years. Furthermore, HFC-134a is very widely used on an industrial scale because of its applications in the refrigeration field.

However, the abovementioned UNEP report teaches that it is technically difficult to manufacture expanded polystyrene by extrusion using HFC-134a as the only blowing agent, because of the very low solubility of this compound in molten polystyrene.

This is because, in order to obtain an expanded polymer of high quality, the solubility of the blowing agent in the molten polymer must be sufficiently high, especially under the temperature conditions in which the blowing agent/molten polymer blend remains in the extruder chamber and passes through the die. The corresponding temperature range is generally between 100 and 300° C., preferably between 110 and 200° C. If this solubility is insufficient or too low, the blend lacks homogeneity and the blowing agent vaporizes prematurely at the die exit, so that a high proportion of the cells of the material have their walls ill-formed or absent. This results in a reduction in the stiffness of the material and, more generally in its mechanical properties. In such a case, too high a density for the desired application is also observed.

To solve this problem, the UNEP report suggests the use of HFC-134a in combination with an organic blowing co-agent, without however recommending a specific organic compound.

DESCRIPTION OF THE INVENTION

It is therefore an object of the present invention in particular to provide a blowing agent for the production of insulating thermoplastic foam which does not represent a danger to the stratospheric ozone layer (ODP equal to 0), based on industrially available HFC, and being able to substitute for HCFC-142b because of substantially equivalent thermal conductivity, permeability and solubility in the molten polymer.

It has now been found that cyclopentane surprisingly has, unlike other similar organic compounds, a particularly high solubility in molten polystyrene and that mixtures of cyclopentane with HFC-134a are well suited to the production of expanded polymers by extrusion, and especially of expanded polystyrene panels.

The subject of the invention is therefore firstly a composition which can be used as a polymer blowing agent, comprising:

from 60 to 98%, preferably from 70 to 96%, of HFC-134a, and from 2 to 40%, preferably from 4 to 30%, of cyclopentane.

The percentages given in the present text are, unless otherwise indicated, percentages by weight. This composition can be directly prepared by simply blending the constituents and is injected into the extrusion chamber at a pressure greater than 10 MPa. It can be also obtained by separate injection of each constituent in the extrusion chamber. It may furthermore include from 0.5% to 33%, preferably from 1% to 26%, of one or more other blowing agents such as carbon dioxide, a hydrocarbon, an alcohol such as ethanol, an ether such as dimethyl ether, ethyl chloride or even another HFC.

The composition according to the invention, because of its solubility in molten polymers, and especially in polystyrene, similar to those of HCFC-142b and HFC-152a, makes it possible to obtain a homogeneous expanded polymer having a uniform distribution of closed cells in the material, and, consequently, the required mechanical properties.

The invention also relates to a polymeric composition which can be used in the production of an expanded polymer, comprising:

from 5 to 15%, preferably from 7 to 12%, of a blowing agent as defined above; and from 85 to 95%, preferably from 88 to 93%, of a thermoplastic polymer.

This composition is produced by hot-blending its ingredients in the extrusion chamber at a temperature between 100 and 300° C., preferably between 110 and 200° C. and at a pressure between 5 and 30 MPa. The pressure in the zone immediately upstream of the die is usually between 5 and 20 MPa, preferably between 6 and 15 MPa. The latter pressure range is particularly advantageous as regards the economics of the process and the possibility of using an existing extrusion device, such as that used with HCFC-142b. Using a pressure within the latter range advantageously results in high solubility of the blowing agent according to the invention in the thermoplastic polymer.

The blowing agent according to the invention may be used in combination with any thermoplastic resin suitable for extrusion, such as polyethylene, polypropylene, polystyrene, and polyvinyl chloride.

According to a preferred variant, the thermoplastic polymer is polystyrene.

Auxiliary compounds may also be included in the composition, such as one or more fire retardants, nucleating agents intended to improve the homogeneity of the cellular structure, colouring agents and plasticizers, such as polyarylalkanes (xylylxylene, benzyltoluene or dibenzyltoluene). The amount of these components is generally between 0.01% and 10%, preferably between 1% and 5%.

Finally, the invention relates to a process for manufacturing an expanded polymer comprising the extrusion through a die of a polymeric composition as defined above.

According to a preferred variant, the extrusion is carried out in an extruder suitable for the use of HCFC-142b as blowing agent. This possibility results from the high solubility of an HFC-134a/cyclopentane composition as described above and is advantageous as it does not require new equipment to be developed.

This process is preferably carried out for the manufacture of expanded polystyrene panels suitable for thermal insulation, especially for buildings.

BRIEF DESCRIPTION OF THE DRAWINGS

Figures:

FIG. 1:

FIG. 1 shows the solubility at 140, 160 and 180° C. of various organic compounds in polystyrene as representative thermoplastic polymer.

The parameter plotted on the y-axis of the graph is the partition coefficient (K) of the solute at infinite dilution between a polymer phase (in this case, polystyrene) and a mobile phase (namely helium), this parameter being measured by inverse gas chromatography.

This parameter is directly proportional to the solubility, the equation connecting them being as follows:

$$S = K/RT \qquad (1)$$

in which:

S is the solubility coefficient expressed in $mol.Pa^{-1}.m^{-3}$;

K is the partition coefficient (dimensionless);

R is the ideal gas constant (expressed in $m^3.Pa.mol^{-1}.K^{-1}$);

T is the absolute temperature (expressed in K).

The polystyrene used for the measurement had a glass transition temperature of about 100° C. and a weight-average molar mass of 250 000 g/mol.

The temperatures used to determine the solubility are representative of those to which the blowing agent/thermoplastic resin blend is heated in the extrusion chamber.

The abbreviations used to represent the compounds tested, and plotted on the x-axis of the graph, have the following meanings:

nC4 represents n-butane

DME represents dimethyl ether iC5 represents isopentane nC5 represents n-pentane EtCl is ethyl chloride EtOH is ethanol cC5 represents cyclopentane This figure clearly shows that the solubility of HFC-134a is much less than that of HCFC-142b, thus confirming the teaching of the abovementioned UNEP report.

In addition, it shows that, unexpectedly, the solubility of cyclopentane is, for the temperatures studied, substantially greater than that of other organic compounds, especially that of the corresponding non-cyclic 5-carbon alkanes.

This fact advantageously allows cyclopentane to be selected for a mixture with HFC-134a resulting in a blowing agent suitable for the production of expanded polystyrene and other thermoplastic polymers.

Figure 1:
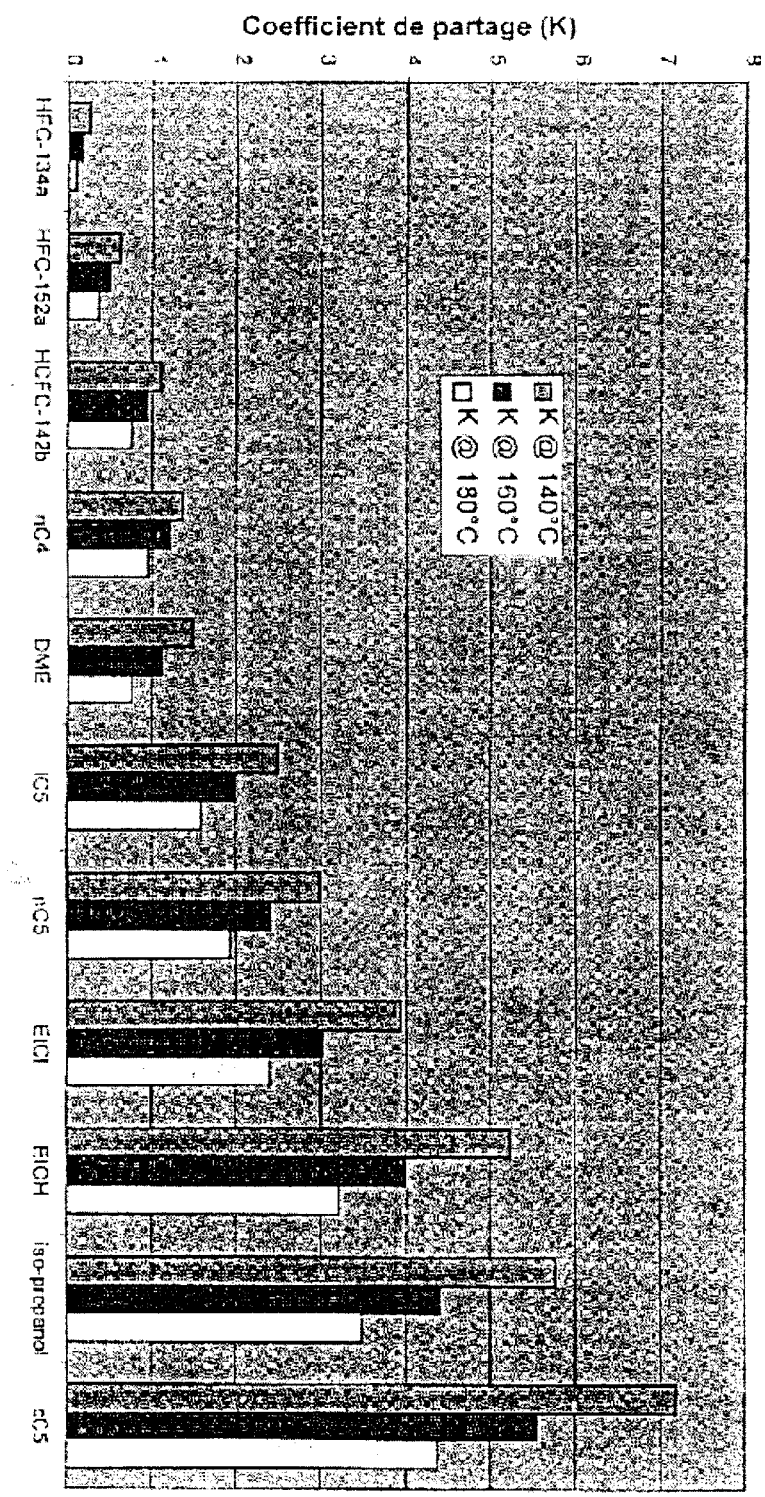
FIGS. 1 and 2 illustrate certain aspects of the invention and the capability of the HFC-134a/cyclopentane mixtures according to the invention to be used as blowing agents for the production of expanded polymers.
Figure 2:
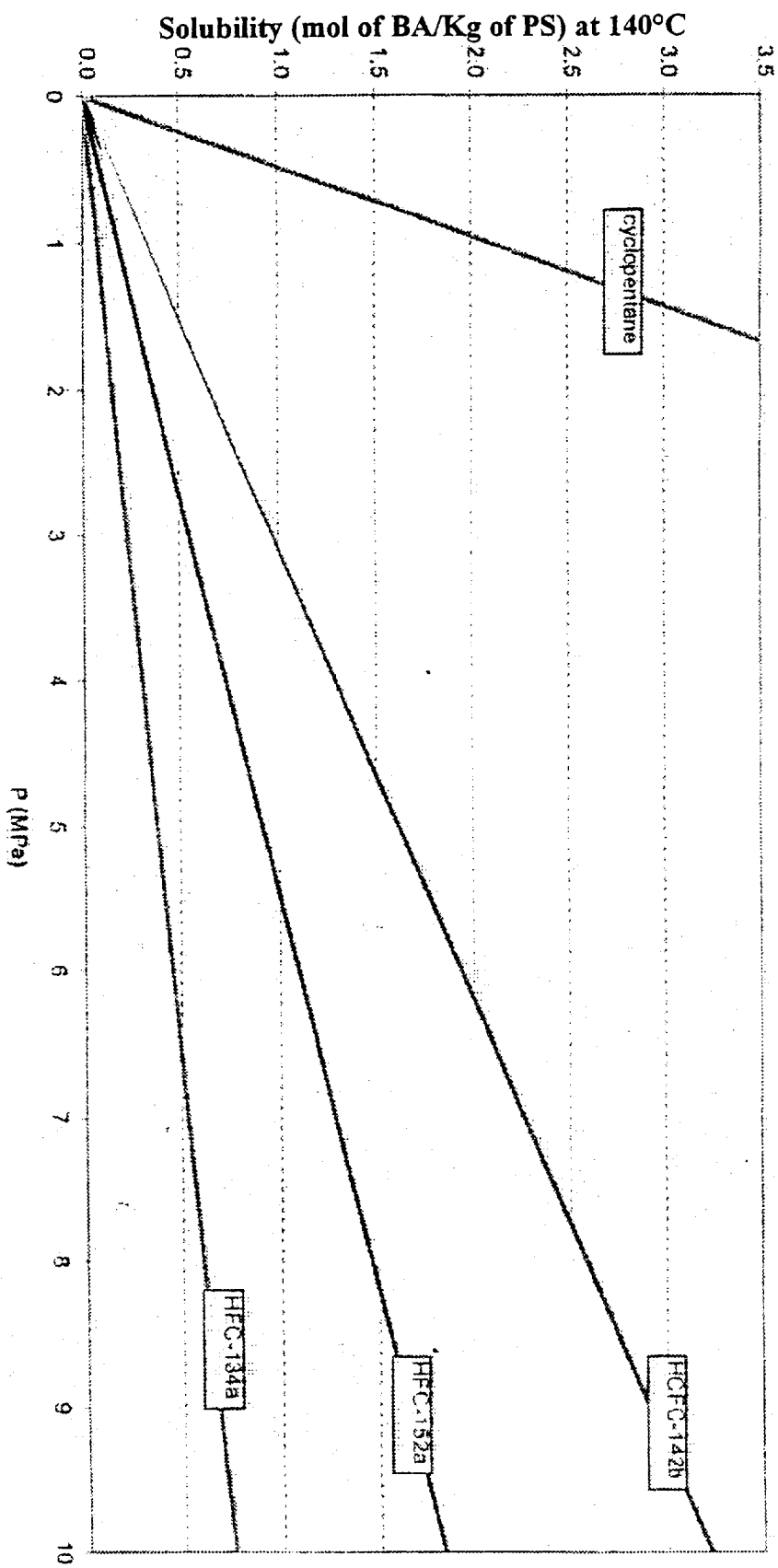

FIG. 2:

The graph in FIG. 2 shows the curve of the solubility in molten polystyrene (expressed as moles of blowing agent per kg of polystyrene) as a function of pressure (expressed in MPa) of the following compounds: cyclopentane, HCFC-142b, HFC-152a, and HFC-134a.

These curves are calculated for a temperature of 140° C. from the previous data, by calculating the solubility by means of equation (1) and then by applying Henry's law.

The pressure range between 6 and 10 MPa is representative of the pressure existing in the zone immediately upstream of the die of a conventional extruder, such as one suitable for using HCFC-142b as blowing agent.

This figure clearly shows the difference in solubility between HFC-134a (unsuitable by itself as a blowing agent) on the one hand, and HCFC-142b and HFC-152a (which are suitable for the same use) on the other hand. It consequently shows in which range the solubility of a blowing agent must preferably lie in order to be able to be used as a blowing agent for polymers, especially polystyrene and more particularly with regard to the homogeneity of the cellular structure and the mechanical properties of an expanded polystyrene panel produced by using the said agent.

EXAMPLES

The following examples illustrate the invention without limiting it.

Example 1

10 g of a composition containing 96% HFC-134a and 4% cyclopentane was prepared by simple mixing.

5 g of polystyrene, having a glass transition temperature of about 100° C. and a weight-average molar mass of around 250 000 g/mol, were placed in a 200 cm$^3$ autoclave. The 10 g of the HFC-134a/cyclopentane mixture were then introduced into this same autoclave at room temperature.

The temperature of the autoclave was then increased to 140° C. Once equilibrium had been achieved, the pressure inside the autoclave was recorded and the number of moles of blowing agent dissolved in the polystyrene was determined.

The experimental point obtained makes it possible to draw, on the graph in FIG. 2, a solubility line which lies more or less superimposed on that representing the solubility of HFC-152a.

This composition is consequently suitable for the production of expanded polystyrene by extrusion.

Example 2

Example 1 was repeated for a composition containing 91% HFC-134a and 9% cyclopentane.

The experimental point obtained makes it possible to draw, on the graph in FIG. 2, a solubility line which lies more or less superimposed with that representing the solubility of HFC-142b.

This composition is consequently also suitable for the production of expanded polystyrene by extrusion.

Example 3

100 parts by weight of a polystyrene having a weight-average molar mass of about 180 000 g/mol, 1.5 parts of hexabromocyclododecane as fire retardant and 0.5 parts of talc as nucleating agent were fed continuously into an extruder normally operating with HFC-142b and having an internal screw diameter of 120 mm. A mixture comprising 92% HFC-134a and 8% cyclopentane (the said mixture representing in total 12% by weight of the thermoplastic composition) was continuously injected into the extruder. The thermoplastic composition was uniformly mixed in the extruder and, after a residence time of 15 minutes, cooled to an exit temperature of 115° C. and extruded at atmospheric pressure through a die of suitable dimensions.

A rectangular panel of homogeneous expanded polystyrene was obtained which had physical and mechanical properties similar to those obtained when HCFC-142b was used as blowing agent with the same extruder.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Composition which can be used as a polymer blowing agent, comprising by weight:
   from 60 to 98% of HFC-134a, and
   from 2 to 40% of cyclopentane.

2. Composition according to claim 1, further comprising from 0.5% to 33% of at least one other blowing agent including carbon dioxide, a hydrocarbon, an alcohol including ethanol, an ether including dimethyl ether, ethyl chloride or another HFC.

3. Polymeric composition for production of an expanded polymer, comprising by weight:
   from 5 to 15% of a composition blowing agent of HFC-134a and cyclopentane; and
   from 85 to 95% of a thermoplastic polymer.

4. Composition according to claim 3, wherein the thermoplastic polymer is polyethylene, polypropylene, polystyrene, or polyvinyl chloride.

5. Composition according to claim 3, wherein the thermoplastic polymer is polystyrene.

6. Composition according to claim 3, further comprising from 0.01% to 10% of a fire retardant, a nucleating agent, a coloring agent and/or a plasticizer.

7. Process for manufacturing an expanded polymer, comprising the extrusion through a die of a polymeric composition as defined in claim 3.

8. Process according to claim 7, wherein the extrusion is carried out in an extruder for use of HCFC-142b as blowing agent.

9. Process for the manufacture of expanded polystyrene panels for thermal insulation comprising manufacture of an expanded polymer according to claim 3.

10. Composition according to claim 1, wherein the amount of HFC-134a is from 70 to 96% and of cyclopentane is from 4 to 30%.

11. Composition according to claim 2, wherein the amount of other blowing agent is from 1% to 26%.

12. Process according to claim 3, wherein the amount of blowing agent is from 7 to 12% a composition of a blowing agent and 88 to 93% of thermoplastic polymer.

13. Composition according to claim 6, wherein the amount is from 1% to 5%.

* * * * *